US012753576B2

(12) United States Patent
Tanaka et al.

(10) Patent No.: US 12,753,576 B2
(45) Date of Patent: Oct. 6, 2026

(54) SYSTEMS, METHODS, AND COMPUTER-PROGRAM PRODUCTS TO CONTROL SEMI-AUTONOMOUS OPERATION OF A MOBILE WORK MACHINE

(71) Applicant: Caterpillar SARL, Geneva (CH)

(72) Inventors: Kensuke Tanaka, Geneva (CH); Yasumasa Hoshino, Geneva (CH); Takashi Yokono, Geneva (CH); Santosh Ram Ancha, Geneva (CH)

(73) Assignee: Caterpillar SARL, Geneva (CH)

( * ) Notice: Subject to any disclaimer, the term of this patent is extended or adjusted under 35 U.S.C. 154(b) by 433 days.

(21) Appl. No.: 18/213,942

(22) Filed: Jun. 26, 2023

(65) Prior Publication Data

US 2024/0426079 A1 Dec. 26, 2024

(51) Int. Cl.
*E02F 9/20* (2006.01)
*E02F 9/26* (2006.01)
*G05D 1/00* (2024.01)

(52) U.S. Cl.
CPC ............ *E02F 9/2045* (2013.01); *E02F 9/205* (2013.01); *E02F 9/26* (2013.01); *G05D 1/0278* (2013.01)

(58) Field of Classification Search
None
See application file for complete search history.

(56) References Cited

U.S. PATENT DOCUMENTS

2012/0050025 A1* 3/2012 Hoeffel .................. B60Q 9/007 340/435
2012/0246981 A1* 10/2012 Magaki ................. E02F 9/2075 414/685
2017/0315553 A1* 11/2017 Kadono ............... G05D 1/0212
2017/0315561 A1* 11/2017 Kadono ............... G05D 1/0214
2018/0181123 A1* 6/2018 Bauer .................. G05D 1/0212
(Continued)

FOREIGN PATENT DOCUMENTS

CN 102765420 A 11/2012
CN 110733304 A 1/2020
(Continued)

OTHER PUBLICATIONS

Translation of JP 2022132988 A (Year: 2022).*
Written Opinion and International Search Report for Int'l. Patent Appln. No. PCT/EP2024/025189, mailed Oct. 25, 2024 (12 pgs).

*Primary Examiner* — Faris S Almatrahi
*Assistant Examiner* — Selena M Jin

(57) ABSTRACT

Systems, methods, and computer-program products for controlling a mobile work machine can comprise activating a steering assist mode to control work machine travel responsive to the steering assist mode being on or enabled, an approach angle of the work machine being within a predetermined angle range relative to a target line for the work machine to perform work at design line or contour, and a focus point of the work machine being within a capture range to activate the steering assist mode. The systems, methods, and computer-program products can also comprise, with the steering assist mode in an activated state, controlling travel of the work machine relative to the target line responsive to receipt of a first operator input in a cab of the work machine and a second operator input in the cab of the work machine at or above a predetermined threshold.

20 Claims, 11 Drawing Sheets

(56) References Cited

U.S. PATENT DOCUMENTS

| | | | | |
|---|---|---|---|---|
| 2018/0305898 | A1* | 10/2018 | Kobayashi | E02F 9/2267 |
| 2018/0355587 | A1* | 12/2018 | Hashimoto | E02F 3/844 |
| 2019/0146489 | A1* | 5/2019 | Zaizen | B60W 60/0053 701/42 |
| 2019/0163194 | A1* | 5/2019 | Scott | G01C 21/20 |
| 2020/0354921 | A1* | 11/2020 | Nishi | E02F 9/123 |
| 2021/0010227 | A1* | 1/2021 | Izumikawa | E02F 9/2282 |
| 2021/0010241 | A1 | 1/2021 | Nishi | |
| 2021/0171051 | A1* | 6/2021 | Takeda | G06V 20/588 |
| 2021/0332566 | A1* | 10/2021 | Shintani | B60K 35/10 |
| 2022/0010521 | A1* | 1/2022 | Izumikawa | E02F 9/2045 |
| 2022/0269278 | A1* | 8/2022 | Nishii | G05D 1/0219 |
| 2022/0412050 | A1* | 12/2022 | Hoaby | E02F 9/2012 |
| 2023/0015153 | A1* | 1/2023 | Morimoto | G05D 1/0016 |
| 2024/0018742 | A1* | 1/2024 | Fukuoka | E02F 9/205 |
| 2024/0301657 | A1* | 9/2024 | Sonoda | E02F 9/2045 |
| 2024/0426079 | A1* | 12/2024 | Tanaka | E02F 9/2045 |

FOREIGN PATENT DOCUMENTS

| | | | | | |
|---|---|---|---|---|---|
| CN | 111731257 | A | | 10/2020 | |
| CN | 111902583 | A | | 11/2020 | |
| CN | 112428986 | A | | 3/2021 | |
| EP | 1278917 | B1 | | 11/2009 | |
| JP | 2022132988 | A | * | 9/2022 | |
| WO | 2019/189935 | A1 | | 10/2019 | |
| WO | 20220202918 | A1 | | 9/2022 | |
| WO | WO-2022251055 | A1 | * | 12/2022 | E02F 9/2041 |

* cited by examiner

SYSTEMS, METHODS, AND COMPUTER-PROGRAM PRODUCTS TO CONTROL SEMI-AUTONOMOUS OPERATION OF A MOBILE WORK MACHINE

TECHNICAL FIELD

The present disclosure relates to an excavator, more particularly to systems, methods, and computer-program products to control semi-autonomous operation of an excavator.

BACKGROUND

A bulldozer's grading operation can be performed by traveling the machine; however, an excavator's digging operation is generally performed without travel of the machine, using front attachments (for digging) and upper structure (for swing). In the case where the excavator does need to move to perform digging operations according to a target design shape of a work area, the excavator needs to travel little by little to change operation position in order to achieve the target design shape. The target design shape and the excavator's position relative to the target design shape can be displayed on a monitor in the excavator cab. However, oftentimes the excavator operator may not look at the monitor during travel operation, instead looking in the traveling direction or the front attachment direction, for instance, for safety concerns. In this regard, it may be difficult for the operator to control travel of the excavator according to appropriate operation positions to meet the target design shape of the work area.

US 2021/0010241 ("the '241 patent publication") describes a shovel that includes a lower traveling body, an upper swiveling body mounted on the lower traveling body so as to be able to swivel, a traveling actuator that drivers the lower traveling body, and a control device in the upper swiveling body to operate the traveling actuator based on information about a target position. According to the '241 patent publication, a setting unit is structured to assist the operator in setting the work target, and the operator sets the slope subjected to the slop work as a construction target by designating a part of the image corresponding to the desired slope on a setting screen. And when the construction target is set, the setting unit automatically sets the traveling route from the present position to the construction target based on the present position of the shovel, the position of the construction target, and the map information. The '241 patent publication further describes that the setting unit may set a traveling route for avoiding an obstacle based on the information acquired by the information acquisition device including the communication device or the space recognition device after recognizing the latest work conditions including the location of the obstacle, for example, and, thereafter, when the operator of the shovel presses the autonomous travel switch, the autonomous control unit allows the shovel to independently travel along the set traveling route. Thus, the '241 patent publication describes autonomous and independent travel after pressing the autonomous travel switch without further control input by the operator.

SUMMARY

According to aspects of the present disclosure, systems, methods, and computer-program products for controlling a mobile work machine can comprise activating a steering assist mode to control mobile work machine travel responsive to the steering assist mode being on or enabled, an approach angle of the mobile work machine being within a predetermined angle range relative to a target line for the mobile work machine to perform work at design line or contour, and a focus point of the mobile work machine being within a capture range to activate the steering assist mode. The systems, methods, and computer-program products can also comprise, with the steering assist mode in an activated state, controlling travel of the mobile work machine relative to the target line responsive to receipt of a first operator input in a cab of the mobile work machine and a second operator input in the cab of the mobile work machine at or above a predetermined threshold.

According to an aspect of the present disclosure, a method can be implemented. The method, which can be regarding semi-autonomous control of an earth moving work machine at a worksite, can comprise: determining, using circuitry, whether a steering assist mode is in an enabled state; determining, using the circuitry, whether an approach angle of the earth moving work machine is within a predetermined angle range relative to a target line; determining, using the circuitry, whether a focus point of the earth moving work machine is within a capture range to activate the steering assist mode; activating, using the circuitry, the steering assist mode under a condition that the steering assist mode is enabled, the approach angle of the earth moving work machine relative to the target line is within the predetermined angle range, and the focus point of the earth moving work machine is at or within a capture area; and with the steering assist mode activated, outputting, using the circuitry, control signaling to semi-autonomously control travel of the earth moving work machine along the target line responsive to receipt of a first operator input in a cab of the earth moving work machine and/or a second operator input in the cab of the earth moving work machine at or above a predetermined threshold.

According to another aspect of the present disclosure, an excavator can be provided or implemented or otherwise implemented in or using the excavator. The excavator can comprise: a lower traveling body including a left track and a right track opposite the left track; an upper swing body including a cab and rotatably supported by the lower traveling body, the cab having a monitor, a left-hand lever to control the left track via a first hydraulic motor, and a right-hand lever to control the right track via a second hydraulic motor; and a controller operatively coupled to access computer-readable memory and configured to implement a semi-automatic steering assist mode of operation for the excavator. The controller can be configured to determine whether a semi-automatic steering assist mode input in the cab is in an on state, determine whether an approach angle of the excavator, under full control of an operator in the cab, is within a predetermined angle range relative to a target line, determine whether a focus point of the excavator is within a capture range to activate the semi-automatic steering assist mode, activate the semi-automatic steering assist mode under a condition that the semi-automatic steering assist mode input in the cab is in the on state, the approach angle of the excavator relative to the target line is within the predetermined angle range, and the focus point of the excavator is at or within a capture area, and with the excavator in the semi-automatic steering assist mode, output control signaling to semi-automatically control travel of the lower traveling body of the excavator toward, to, and along the target line responsive to receipt of a first operator input in the cab and/or a second operator input in the cab continuously at or above a predetermined threshold.

Yet another aspect of the present disclosure can involve a non-transitory computer-readable storage medium having stored thereon instructions that, when executed by one or more processors of a hydraulic excavator, causes the one or more processors to perform a method comprising: activating a steering assist mode to control travel of the hydraulic excavator responsive to the steering assist mode being in an enabled state, an approach angle of the hydraulic excavator being within a predetermined angle range relative to a target line for the hydraulic excavator to perform work at design line or contour at a worksite, and a focus point of the hydraulic excavator being within a capture area to activate the steering assist mode; and with the steering assist mode in an activated state based on said activating, controlling travel of the hydraulic excavator relative to the target line responsive to receipt of a first operator input in a cab of the hydraulic excavator and a second operator input in the cab of the hydraulic excavator at a same time and continuously at or above a predetermined threshold.

DETAILED DESCRIPTION

The present disclosure relates to an excavator, particularly, systems, methods, and computer-program products for semi-autonomous control of an excavator.

Figure 1:
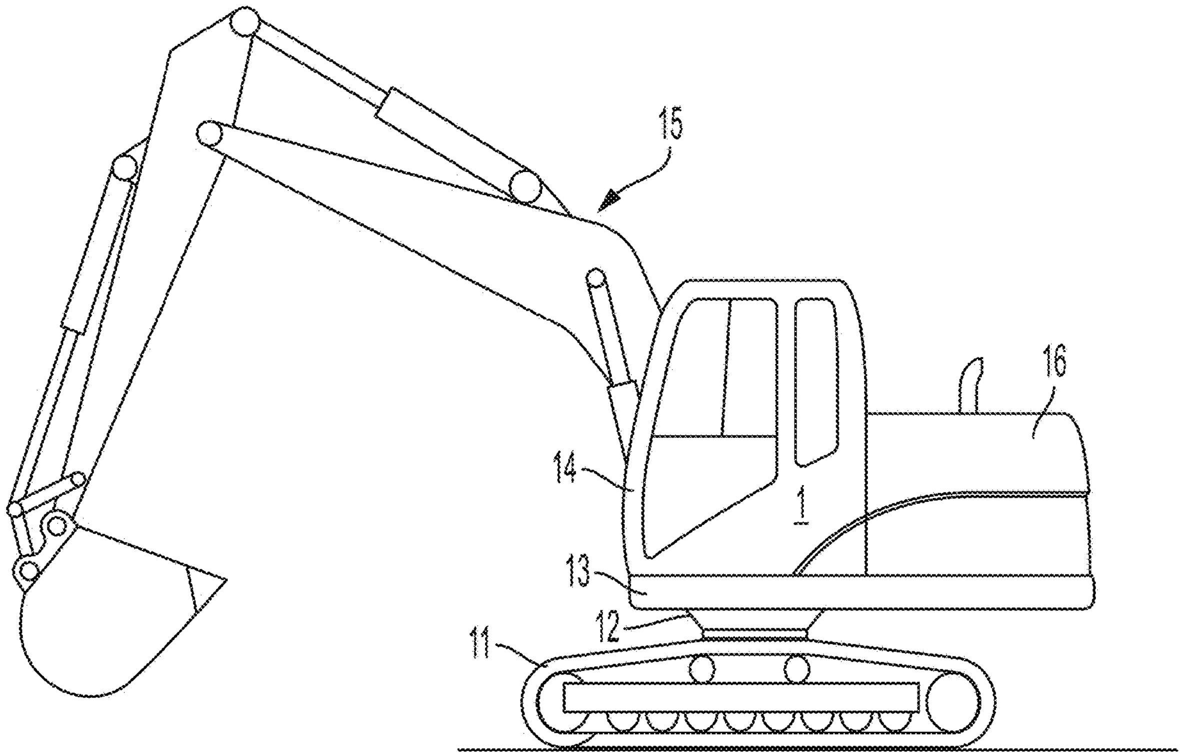
FIG. 1 is a side view of an excavator as example of a mobile work machine according to one or more embodiments of the disclosed subject matter.

Turning to the figures, FIG. 1 shows an excavator (e.g., hydraulic) as a work machine 1, according to one or more embodiments of the disclosed subject matter, though embodiments of the disclosed subject matter are not so limited. The work machine 1 in the form of an excavator may be referred to as a crawler.

Regarding the work machine 1, an upper swing body 13 can be rotatably provided as a machine body on a lower traveling body 11, via a swing bearing portion 12. The lower traveling body 11 can have left and right tracks controllable (via respective hydraulic motors) to cause the work machine 1 to travel in a travel direction (forward or reverse). A cab 14 can be mounted on one side of a front part of the upper swing body 13, and a driver's seat, one or more operation levers, and the like can be installed in the cab 14. Furthermore, a boom 15 for excavation work can be mounted on the other side of the front part of the upper swing body 13. An engine and a power device such as a hydraulic pump which is driven by the engine can be mounted on the rear part of the upper swing body 13 and covered with a power device cover 16.

Figure 2:
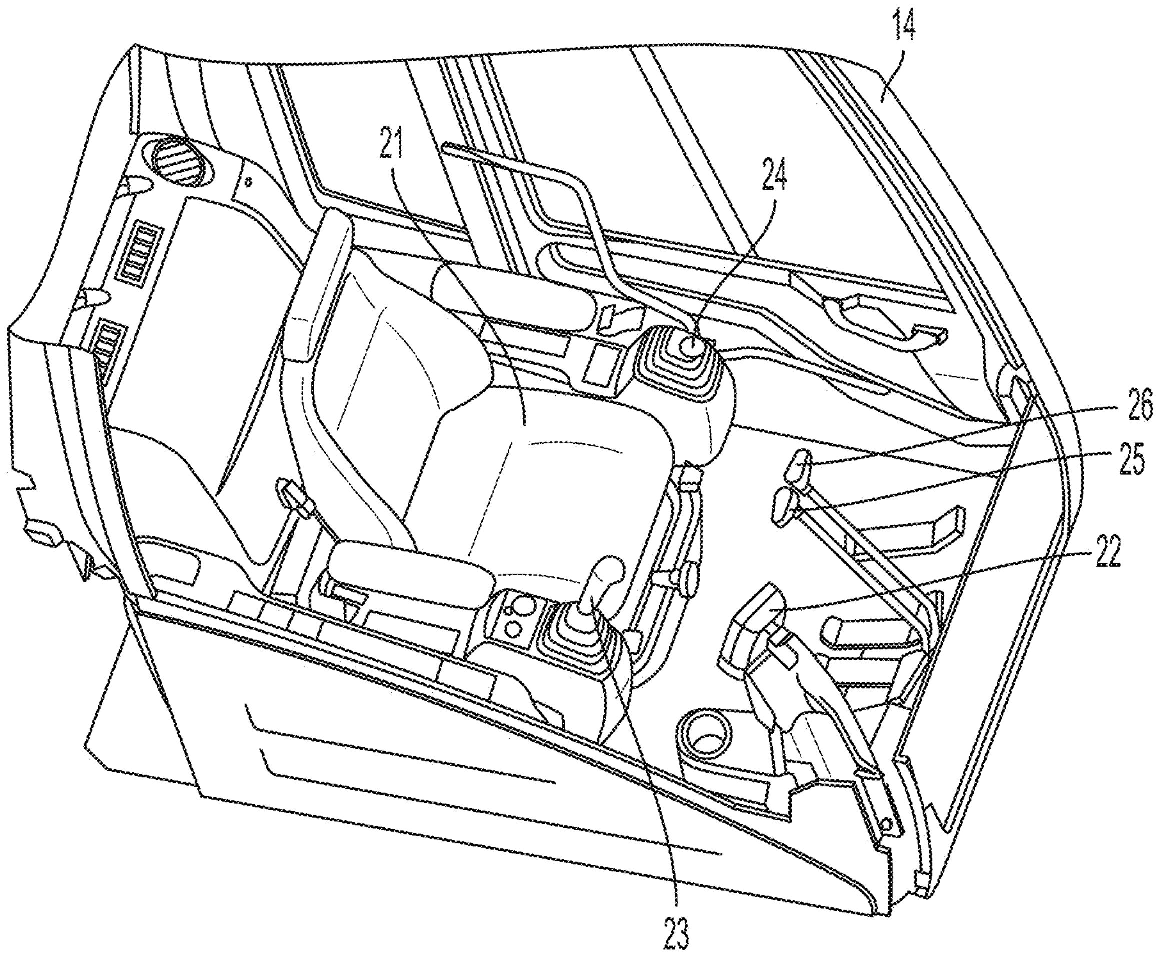
FIG. 2 is a perspective view of a cab of the mobile work machine of FIG. 1.

FIG. 2 shows an example of inside of the cab 14 of the work machine 1 shown in FIG. 1. The cab 14 can include an operator's seat 21, a monitor 22, an operation lever 23, and an operation lever 24. Though one monitor 22 is shown, embodiments of the present disclosure can include more than one monitor. The operator of the work machine 1 can receive various information shown on the monitor 22. The operator can control the work machine 1 by the operation lever 23 and/or the operation lever 24. Additionally or alternatively, the operator can control the work machine 1 by an operation lever 25 and/or an operation lever 26 (see, e.g., FIG. 2). The operation lever 23 and/or the operation lever 24 may be in the form of a joystick.

Figure 3:
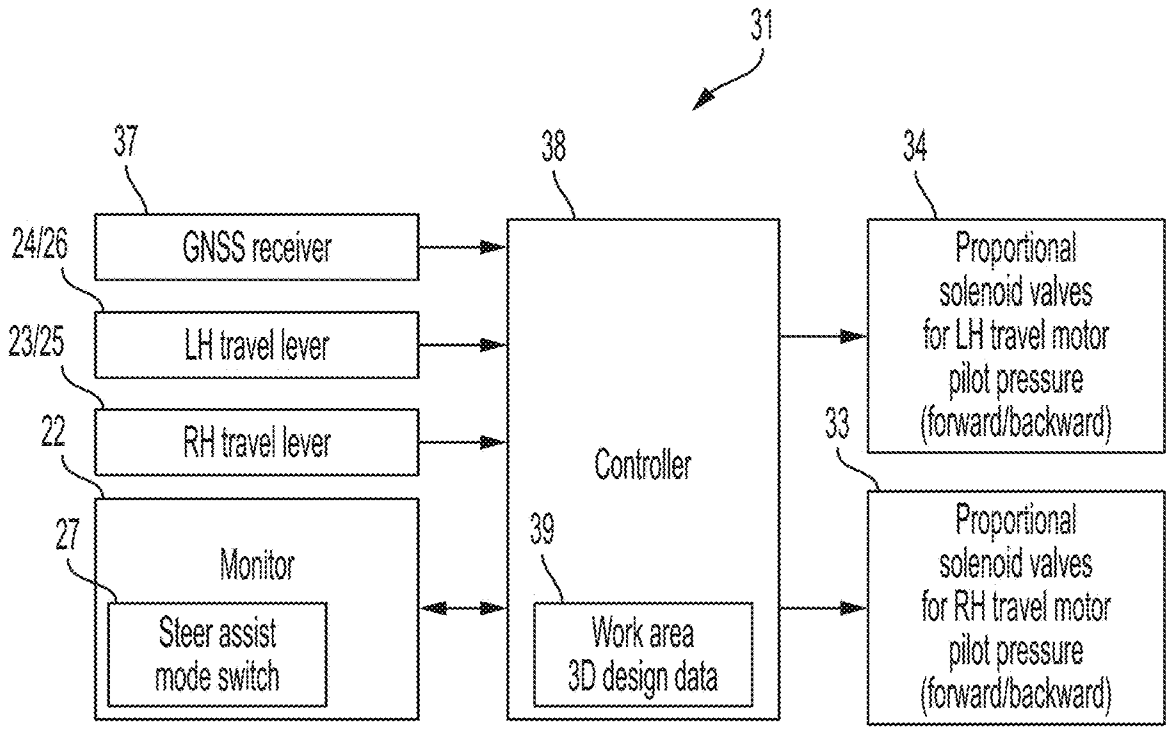
FIG. 3 is a block diagram of a control system according to one or more embodiments of the present disclosure.

Turning now to FIG. 3, FIG. 3 is a block diagram of a control system 31, according to one or more embodiments of the disclosed subject matter. As illustrated in FIG. 3, the control system 31 can include a controller 38, which may be implemented in or using control circuitry, one or more operator inputs 32, one or more displays, which may be implemented via the monitor 22, and one or more sensors 37. The controller 38, as implemented according to embodiments herein, can include only one controller or multiple controllers.

The control system 31 may also include memory 39. The memory 39, which can be non-transitory and computer-readable, can be operatively coupled to the controller 38 and may reside outside of the controller 38 and/or within the controller 38, i.e., as part of the controller 38. Thus, the controller 38 can ROM and RAM. Generally, the memory 39 can receive and save therein data or information regarding operation of the work machine 1. As examples, the memory 39 can receive and save therein work area three-dimensional (3D) design data (e.g., surface and/or line), target design shape (e.g., surface and/or line) created based on the 3D design data, machine settings, machine position data, etc.

In an exemplary implementation, the control system 31 of the work machine 1, or portions thereof (e.g., the controller 38), can be implemented using circuitry or processing circuitry that can include general purpose processors, special purpose processors, integrated circuits, ASICs ("Application Specific Integrated Circuits"), CPU (a Central Processing Unit), a micro processing unit (MPU), conventional circuitry and/or combinations thereof which are configured or programmed to perform the disclosed functionality. Processors can be considered processing circuitry or circuitry as they include transistors and other circuitry therein. The processor may be a programmed processor which executes a program stored in a memory. In the disclosure, the circuitry, units, or means can be hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units can be a combination of hardware and software, the software being used to configure the hardware and/or processor.

The one or more sensors 37 can detect various data or information of the work machine 1. For instance, the one or more sensors 37 can include a position sensor, such as a global navigation satellite system (GNSS), to determine or identify position of the work machine 1 in real time. The GNSS sensor 37 may be regarded as a GNSS receiver. The one or more sensors 37 may also include a position sensor or sensors associated with rotation or swing of the work machine 1, extending or contracting of the boom 15, a triaxial acceleration sensor (including an acceleration sensor, a gravity detection sensor, and a fall detection sensor), and/or a triaxial gyro sensor (including an angular velocity sensor, and a geomagnetic sensor). Outputs from the one or more sensors 37 can be sent to the controller 38 for processing. Optionally, information from at least one of the one or more sensors 37 may be displayed on the monitor 22.

The operator input(s) 32 can include the operation lever 23 and the operation lever 24, each of which may be in the form of a joystick, to control movement of the work machine 1 as a whole (i.e., forward, reverse, turning left, turning right, etc.). Additionally or alternatively, the operator input(s) 32 can include the operation lever 25 and the operation lever 26 to control movement of the work machine 1 as a whole (i.e., forward, reverse, turning left, turning right, etc.). The operation lever 23 may be regarded as a right-hand travel lever and the operation lever 24 may be regarded as a left-hand travel lever respectively on the right and left sides of the operator's seat 21. According to one or more embodiments, operator input to the operation lever 23 or the operation lever 24 can control rotation or swing of boom 15, work implement, etc. of the work machine 1. Additionally or alternatively, RH/LH travel motors can be controlled by the operation lever 25 (which may be regarded as a RH travel lever) and operation lever 26 (which may be regarded as a LH travel lever).

Figure 11:
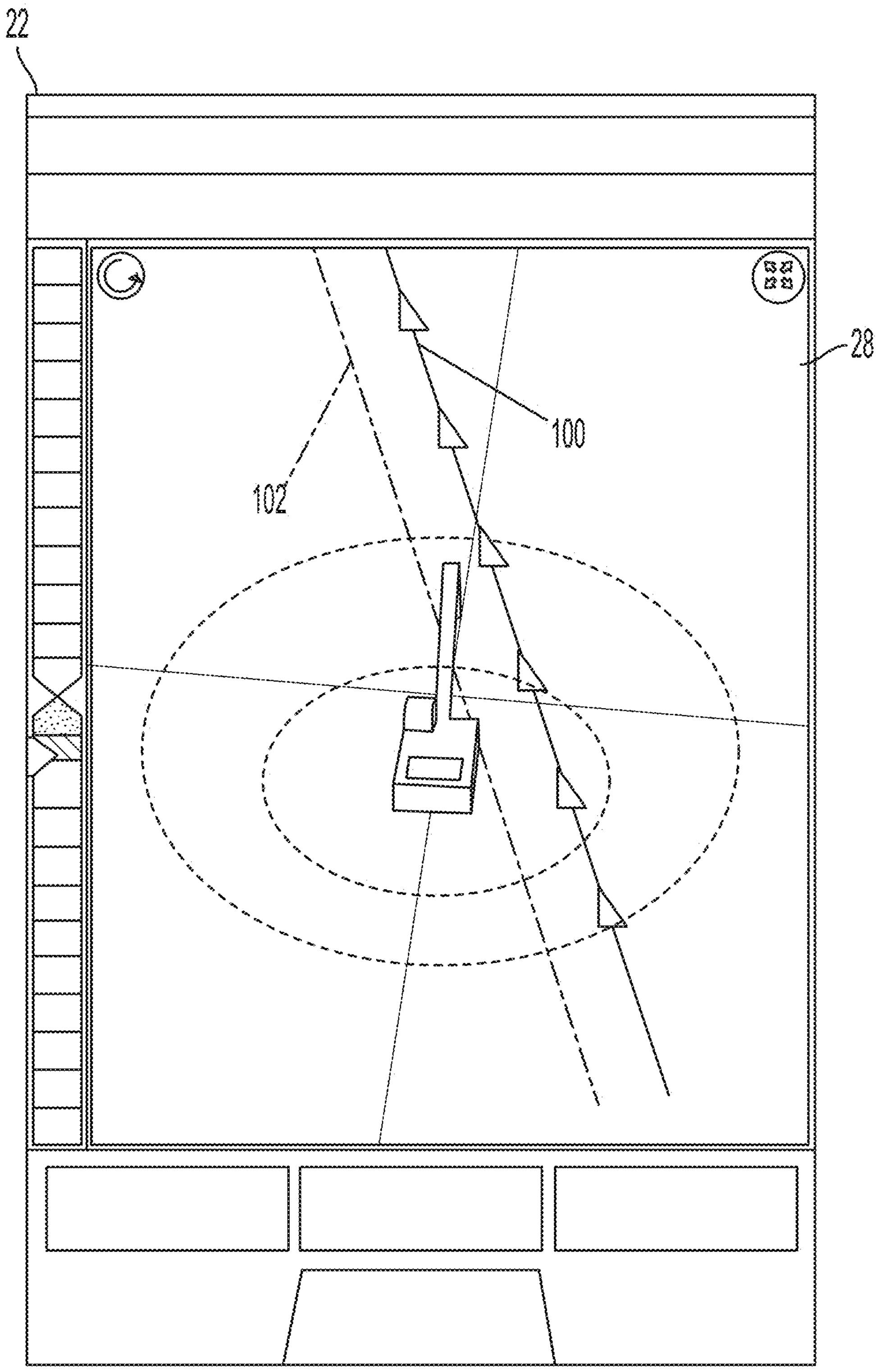
FIG. 11 shows an operator interface for a mobile work machine according to one or more embodiments of the present disclosure.

Operator input(s) 32 can also include or be implemented via an operator interface including the monitor 22. That is, according to one or more embodiments, the monitor 22 may constitute or be part of the operator input(s) 32, and may be regarded as an operator interface. The monitor 22 may be implemented as a touch panel display device operative to display a graphical user interface (GUI) to receive input(s) from the operator. For instance, the operator can activate a steering assist mode command via a "button" or "switch" 27 or the like on the touch panel display to activate or ready a steer assist mode for operation of the work machine 1. Alternatively, the steering assist mode operator input may be implemented via an operator input 32 other than the monitor 22 in the form of a touch screen, for instance, via a mechanical press-button or switch 27 on the monitor 22, on a control panel in the cab 14, or on one of the operation lever 23 or the operation lever 24. Optionally, the monitor 22 can output information to the operator, such as alerts, messages, mode indications, work area three-dimensional (3D) design data (e.g., surface and/or line indicia), target design shape (e.g., surface and/or line indicia) created based on the 3D design data, machine settings, machine position indicia, etc. Discussed in more detail below, FIG. 11 shows an exemplary display on the monitor 22 showing the work machine 1, in operation, relative to a design line and a target line.

The control system 31 may also include a communication unit and an audio unit. The communication unit can include transmit circuitry, i.e., a transmitter, to transmit information or data, such as information of the engine state and/or, to a back office system. Optionally, the communication unit can have receive circuitry, i.e., a receiver, to receive information or data, for instance, from the back office system. In embodiments, the communication unit can be configured using a communication device such as a local CAN, a wired or wireless LAN, a communication card for Bluetooth, a router for communication, and a modem for communication, as examples. The audio unit may be comprised of one or more audio speakers, for instance, provided in the cab 14, to output audible information, such as alerts, to the operator of the work machine 1. As examples, the audio unit may output an audible alert when the work machine 1 has reached a capture range or area, when steering assist mode is activated or readied, or when the steering assist mode is deactivated.

Figure 4:
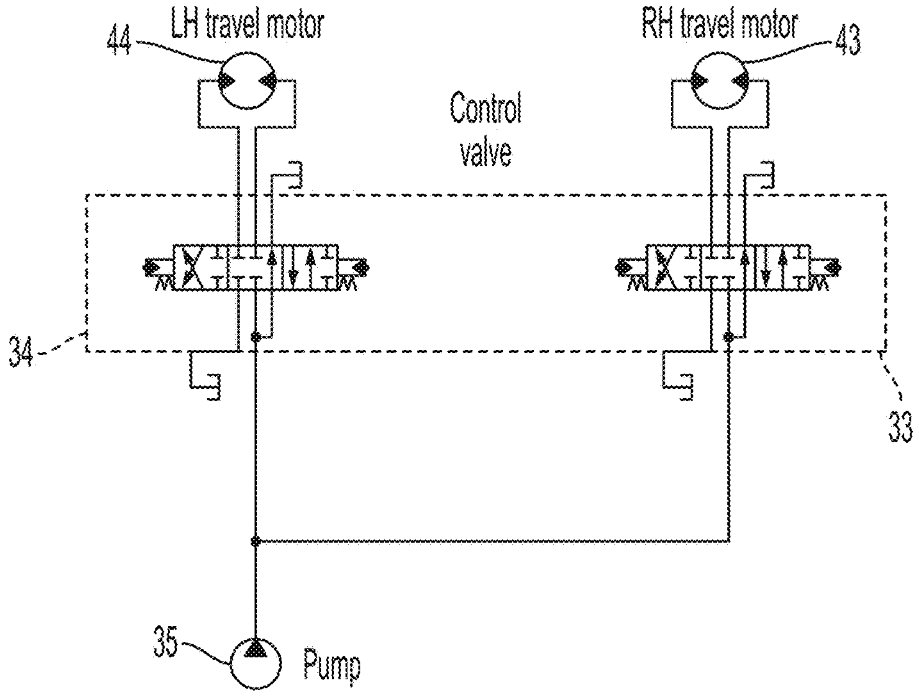
FIG. 4 is a block diagram of a portion of a hydraulic control system according to one or more embodiments of the present disclosure.

The controller 38 can output control signaling to various system components (e.g., hydraulic systems, electrical systems, etc.) to control movement of the working machine 1 responsive to the operator input(s) 32. Referring to FIG. 3 and FIG. 4, the controller 38 can output control signaling to valve 33 and valve 34 based on respective inputs from the operation lever 23 and the operation lever 24 (or the operation lever 25 and the operation lever 26). Here, the valve 33 can be a proportional solenoid valve operatively coupled to a hydraulic motor 43 to control the hydraulic motor 43 responsive to operation of the operation lever 23 (or operation lever 25). A pump 35 may supply hydraulic fluid to the hydraulic motors 43, 44. Likewise, the valve 34 can be a proportional solenoid valve operatively coupled to a hydraulic motor 44 to control the hydraulic motor 44 responsive to operation of the operation lever 24 (or operation lever 26). As noted above, the operation lever 23 (or operation lever 25) may be regarded as a right-hand travel lever and the operation lever 24 (or operation lever 26) may be regarded as a left-hand travel lever respectively on the right and left sides of the operator's seat 21. Thus, in that operation lever 23 (or operation lever 25) controls operation of the hydraulic motor 43 via the valve 33, and hence the right track of the lower traveling body 11, the hydraulic motor 43 may be regarded as a right travel motor. Similarly, in that operation lever 24 (or operation lever 26) controls operation of the hydraulic motor 44 via the valve 34, and hence the left track of the lower traveling body 11, the hydraulic motor 44 may be regarded as a left travel motor.

Figure 5:
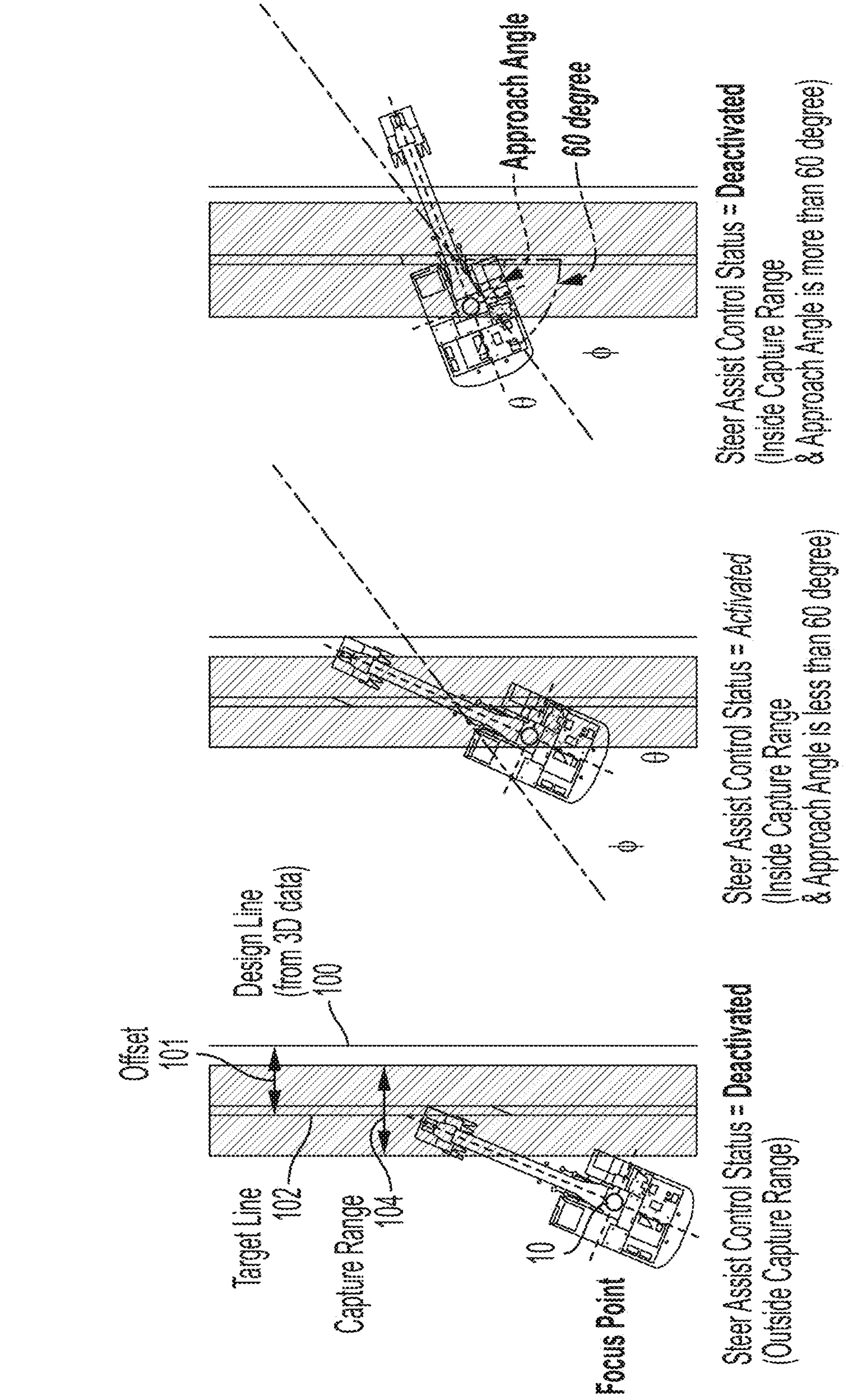
FIG. 5 shows diagrams representative of exemplary conditional requirements to activate a steering assist mode according to one or more embodiments of the present disclosure.

Turning now to FIG. 5, FIG. 5 shows diagrams representative of exemplary conditional requirements to activate or maintain a steering assist mode according to one or more embodiments of the present disclosure. Here, the steering assist mode, which may be regarded as a semi-automatic or semi-autonomous steering assist mode, can be activated (or remain in the active state) so long as the following three conditions are met: an angle $\theta$ of the work machine 1 is within a predetermined angle range $\phi$ relative to a target line 102 for the work machine 1 to perform work at a design line 100 (or contour) at a worksite, a focus point 10 of the work machine 1 is within a capture range or area 104 to activate the steering assist mode (or keep the steering assist mode activated), and the steering assist mode is turned on or enabled (i.e., in an "ON" or enabled state). Incidentally, the design line 100 can be straight or curved or a combination of straight and curved portions. The target line 102 can follow the shape of the design line 100 and, thus, can also be straight or curved or a combination of straight and curved portions.

Here, in FIG. 5 (and subsequent figures), the focus point 10 of the work machine 1 can be a boom center of the work machine 1. Here, boom center can be regarded as an intersecting point of a center line of the boom in the longitudinal direction and machine left and right direction line through the machine center (i.e., swing center). According to one or more embodiments of the disclosed subject matter, the boom can be the machine center, such as shown in FIG. 5, though embodiments of the disclosed subject matter are not so limited, and the focus point 10 can instead be the boom center offset to the left or the right of the machine center. The focus point 10 of the work machine 1 may be regarded as the portion of the work machine 1 aligned with or to be aligned with the target line 102. GNSS can detect (or be used to detect) the machine center position but may not detect the boom center. As such, the controller 38 can calculate the boom center using the 3D data, detected machine center position, and center position and positional relationship between the machine center and the boom center. In this regard, the boom center as the focus point 10 can facilitate the operator aligning the work tool with the design line 100 via steering assist control in the steering assist mode.

As noted earlier, the memory 39, which can be accessed by the controller 38, can store work area three-dimensional (3D) design data (e.g., surface and/or line data for the worksite) regarding actual work to be performed at the worksite. The work machine 1 can be assigned to perform some or all of the work. The 3D design data regarding the actual work may be used to set the design line 100. Optionally, the operator can set the design line 100 via one or more inputs to the monitor 22.

The target line 102, which may be regarded as a travel target line, can be set or determined based on an offset 101 from the design line 100. Here, the controller 38 can determine the target line 102 based on a previously input offset 101. In this regard, the operator may have previously provided the offset 101 for storage in and retrieval from the memory 39. Thus, according to one or more embodiments, the operator can set the amount of the offset 101 from the design line 100. Alternatively, the target line 102 can be set or designated without use of a previously provided offset 101. That is, the offset 101 may not have been provided or otherwise is not used to set or designate the target line 102. The target line 102 may also be set without regard to the design line 100. That is, the operator can manually set the target line 102 without necessarily considering the design line 100. According to one or more embodiments, the operator can set or designate the target line 102 by providing one or more inputs to the monitor 22. Such setting or designating may be regarded as selecting the target line 102.

The capture range or area 104 may be regarded as a range or area associated with how close the focus point 10 of the work machine 1 must be from the target line 102 in order to activate the steering assist mode (so long as other activation conditions are met). That is, the capture range or area 104 can be indicative of distance from the target line 102 to potential start the steering assist control (assuming all activation criteria are met). Optionally, the minimum range for the capture range 104 can be set by the operator, for instance, via one or more inputs to the monitor 22.

Figure 6:
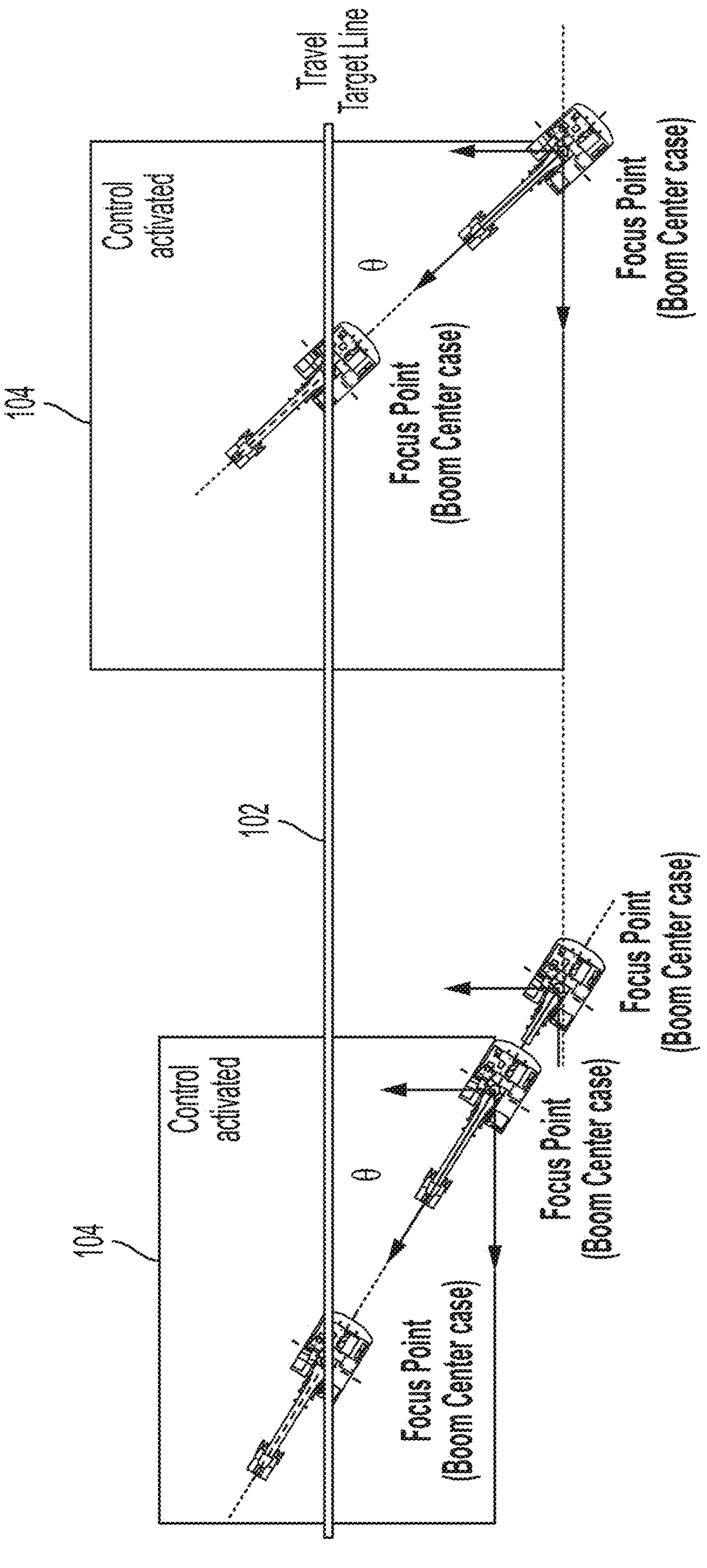
FIG. 6 shows diagrams representative of a variable capture range or area for activating the steering assist mode according to one or more embodiments of the present disclosure.

Referring now to FIG. 6, this figure shows diagrams representative of a variable capture range or area 104 for activating the steering assist mode according to one or more embodiments of the present disclosure. Notably, the capture range 104 can vary based on the approach angle of the work machine 1. In particular, when the work machine 1 travel approach angle θ is relatively large, such as shown in the right diagram of FIG. 6, the capture range 104 can become relatively wide in order to start or activate the steering assist control earlier enough so the work machine 1, particularly the left and right hydraulic motors 43, 44 thereof, can be controlled so the travel path of work machine 1 is such that the focus point 10 of the work machine 1 can become aligned with the travel target line 102. Conversely, when the work machine 1 travel approach angle θ is relatively small, such as shown in the left diagram of FIG. 6, the capture range 104 can become more relatively narrow in order to start or activate the steering assist control so the work machine 1, particularly the left and right hydraulic motors 43, 44 thereof, can be controlled so the travel path of work machine 1 is such that the focus point 10 of the work machine 1 can become aligned with the travel target line 102. Here, the controller 38 can continuously calculate the angle (including the approach angle) of the work machine 1 relative to the target line 102 using GNSS data, for instance, corresponding to the focus point 10 of the work machine 1.

Referring again to FIG. 5, the controller 38 can implement the steering assist mode and corresponding semi-automatic or autonomous travel control of the work machine 1. That it, the controller 38 can determine whether and when to activate the steering assist mode. This can include declining to activate the steering assist mode, for instance, when one or more of the aforementioned exemplary condition requirements are not met. Such declining activation can be performed prior to the controller 38 determining that all of the exemplary condition requirements are met and subsequent activation of the steering assist mode.

Regarding FIG. 5, one assumption for all three diagrams can be that the steering assist mode is turned "ON" or enabled. The steering assist mode may be turned on or enabled by the operator prior to entering the capture range 104. The steering assist mode "ON" or enable switch 27 may be on the monitor 22, for instance, on a graphical user interface (GUI) thereof, or elsewhere in the cab 14, such as the operation lever 23, the operation lever 24, or some other control panel in the cab 14. Thus, the steering assist mode may be enabled (e.g., via a steering assist mode "ON" switch 27 or the like) without being activated.

The left diagram of FIG. 5 represents a condition where the focus point 10 of the work machine 1 is outside of the capture range 104. Hence the steering assist mode is not activated, even though the approach angle θ of the work machine 1 is within the predetermined angle range.

The middle diagram of FIG. 5 represents a condition where the focus point 10 of the work machine 1 is within the capture range 104 and the approach angle θ of the work machine 1 is within the predetermined angle range ϕ. In this scenario, the steering assist control can be activated upon the focus point 10 of the work machine 1 entering the capture range 104. According to one or more embodiments, activating the steering assist mode can transition control of the work machine 1 from a manual mode, for instance, under full control of the operator, to semi-automatic or semi-autonomous control by the operator, for instance, using the operation lever 23 and/or the operation lever 24 (or the operation lever 25 and/or the operation lever 26). Optionally, an alert or message may be output within the cab 14, for instance, on the monitor 22, indicating to the operator that the steering assist mode has been activated.

The right diagram of FIG. 5 represents a condition where the focus point 10 of the work machine 1 is within the capture range 104, but the approach angle θ of the work machine 1 is outside of the predetermined angle range ϕ. In this scenario, the steering assist control may not be activated upon the focus point 10 of the work machine 1 entering the capture range 104. Such larger approach angle can mean the operator does not intend to align travel of the work machine 1 with the target line 102. As a non-limiting example, the angle range ϕ in the case of an approach angle for the work machine 1 approaching the target line 102 can be greater than zero to sixty degrees. In the case of the work machine 1 traveling on the target line 102, the work machine 1 can be at or about at a zero angle relative to the target line 102. Optionally, an alert or message may be output within the cab 14, for instance, on the monitor 22, indicating to the operator that the steering assist mode is not able to be activated.

Activation can also involve a first operator input in the cab 14 and/or a second operator input in the cab 14 being at or above a predetermined threshold. Examples of the first operator input and the second operator input include operation of the operation lever 23 and operation of the operation lever 24, respectively (or operation of the operation lever 25 and the operation lever 26). More specifically, the operator can operate one or both of the operation levers 23, 24 (or operation levers 25, 26) forward to be at or above a predetermined threshold output for the hydraulic motor 43 and the hydraulic motor 44, respectively. As examples, the predetermined threshold can be 100% forward for the operation levers 23, 24 (or operation levers 25, 26), 50% forward for the operation levers 23, 24 (or operation levers 25, 26), or 25% forward for the operation levers 23, 24 (or operation levers 25, 26). Discussed in more detail below, when the steering assist mode is activated, the outputs of the hydraulic motor 43 and/or the hydraulic motor 44 may not correspond to the actual value of the operation levers 23, 24 (or operation levers 25, 26), because the controller 38 can automatically control the outputs of the hydraulic motor 43 and/or the hydraulic motor 44 to make the travel path of the work machine 1 line up with the target line 102 and, once aligned, travel along the target line 102 as the work machine 1 performs work operations (e.g., earth moving operations) along the target line 102.

The first operator input and/or the second operator input can be above the predetermined threshold prior to entering the capture range 104 and can remain above the predetermined threshold when the work machine 1 is within the capture range 104 in order to keep the steering assist mode in the active state. Thus, when the work machine 1 is in the steering assist mode, i.e., the steering assist mode is active, the controller 38 can control travel direction to keep the focus point 10 is on the travel target line 102. That is, the controller 38 can output control signaling to the hydraulic motor 43 and/or the hydraulic motor 44, via the valves 33, 34, to adjust the left/right travel motor speed automatically, regardless of the operator's travel lever operation strokes.

Regarding operation in the steering assist mode, when the focus point 10 of the work machine 1 is in the capture range 104 and the steering assist mode is ON (e.g., by the steer assist switch 27 located on the monitor 22, or on the joystick, etc.) and if the work machine 1 is detected to be traveling not in or for alignment with the target travel line 102 (e.g., the focus point 10 is out of the travel target line 102 and/or detected traveling toward different direction from the travel target line 102), the steer assist control, implemented by the controller 38, can control output of the travel control signaling as follows, as examples, to adjust travel direction so that the work machine position and travel direction will be align to the target travel line 102.

As an example, the LH/RH travel lever stroke, i.e., the operation lever 23/the operation lever 24 or the operation lever 25/the operation lever 26 can both be at 100% output for the left hydraulic motor 44 and the right hydraulic motor 43 both to operate at 100% for straight travel; for LH travel, i.e., to turn the work machine 1 left, the travel control signal for the left hydraulic motor 44 can be reduced from 100%, even with the operation lever 23/the operation lever 24 both still at 100% (or the operation lever 25/the operation lever 26 both still at 100%); and for RH travel, i.e., to turn the work machine 1 right, the travel control signal for the right hydraulic motor 43 can be reduced from 100%, even with the operation lever 23/the operation lever 24 both still at 100% (or the operation lever 25/the operation lever 26 both still at 100%). To be clear, however, the travel command(s) can be created not only by travel levers, i.e., operational levers 23/24 or 25/26, but also by other travel operation devices such as travel pedals. And future work machine 1 travel position (distance from the travel target line 102) and approach angle θ can be estimated using current travel speed and approach angle θ. The controller 38 can control reduction % of a travel signal to the hydraulic motor 43 and/or the hydraulic motor 44 so that the future approach angle θ will be 0 (zero) when the estimated future work machine 1 travel position is on the travel target line 102.

The controller 38 can deactivate the steering assist mode responsive to determining that the first operator input in the cab 14 and/or second operator input in the cab 14 is below the predetermined threshold. As noted above, examples of the first operator input and the second operator input include operation of the operation lever 23 and operation of the operation lever 24, respectively. Further, travel lever stroke can represent the predetermined threshold. Thus, when the stroke of the operation lever 23 and/or the operation lever 24 is below the predetermined threshold, for instance, for a predetermined period of time (e.g., 0.5 seconds), then the controller 38 can deactivate the steering assist mode. A specific example can involve both the operation lever 23 and the operation lever 24 being in the neutral position. Optionally, the operation levers 23, 24 can be in the neutral position for a predetermined period of time (e.g., 0.5 seconds) before the controller 38 deactivates the steering assist mode. As another example, the controller 38 may deactivate the steering assist mode when a stroke different between the operation lever 23 and the operation lever 24 exceeds a certain value (e.g., 25% difference). The controller 38 may also disable the steering assist mode in response to a loss of GNSS communication functionality.

INDUSTRIAL APPLICABILITY

As noted above, embodiments of the present disclosure relate to an excavator, more particularly to systems, methods, and computer-program products to control semi-autonomous operation of a work machine, such as an excavator.

For efficient digging operation according to a target design shape of a work area, it can be desirable for the work machine to remain on appropriate operation positions for digging operations according to the target design shape of the work area, considering the work machine front attachment work range.

Aspects of the present disclosure can address the above-identified issue, among other issues, and can implement one or more (e.g., all) of following features: travel target line can be selected on the work machine monitor, for instance, based on the design line (end of the design surface) in the work area 3D design data; the work machine can travel along with the travel target line, by the operator's travel operation; in the steering assist mode, when the operator operates left/right travel levers (for an example, with full stroke like as straight travel), the excavator travels along with the preliminary selected travel target line; for travel control along with the travel target line, the capture range can be set along with the travel target line to start the steering control; and when the steering control is started, the excavator controller controls travel direction (steering direction) to keep a focus point of the work machine and/or of the steering on the travel target line.

Operator's manual travel operation can be implemented, as opposed to fully automatic or autonomous travel, because the steer control can control travel direction by reducing travel command originally created by the operator's travel operation. Thus, the control can be effective even if the travel operation is not with full lever stroke.

Advantages according to one or more embodiments of the present disclosure, among multiple advantages, can include the following: By the semi-automatic travel control which controls an excavator to travel along the target line based on the operator's travel lever operation, the operator can travel the excavator to the appropriate operation positions for the target design shape just with a simple straight travel lever operation, without checking the positional relationship between the target design shape data of the construction site and the hydraulic excavator on the monitor; the target line can be set based on the target design shape data (3D data) so that the excavator can travel straight when the target design shape is straight, and also travel with adjusting travel direction when the target design shape is curved, only by the operator's simple straight travel lever operation; and from the point of travel safety, the semi-automatic travel control according to embodiments of the present disclosure may be helpful than the autonomous travel controls, for instance, because according to embodiments of the present disclosure the work machine can be controlled to travel based on the operator's travel operation (operator's travel request) so that the operator can avoid collisions with unexpected obstacles or moving objects/humans easier than with autonomous travel control.

Figure 7:
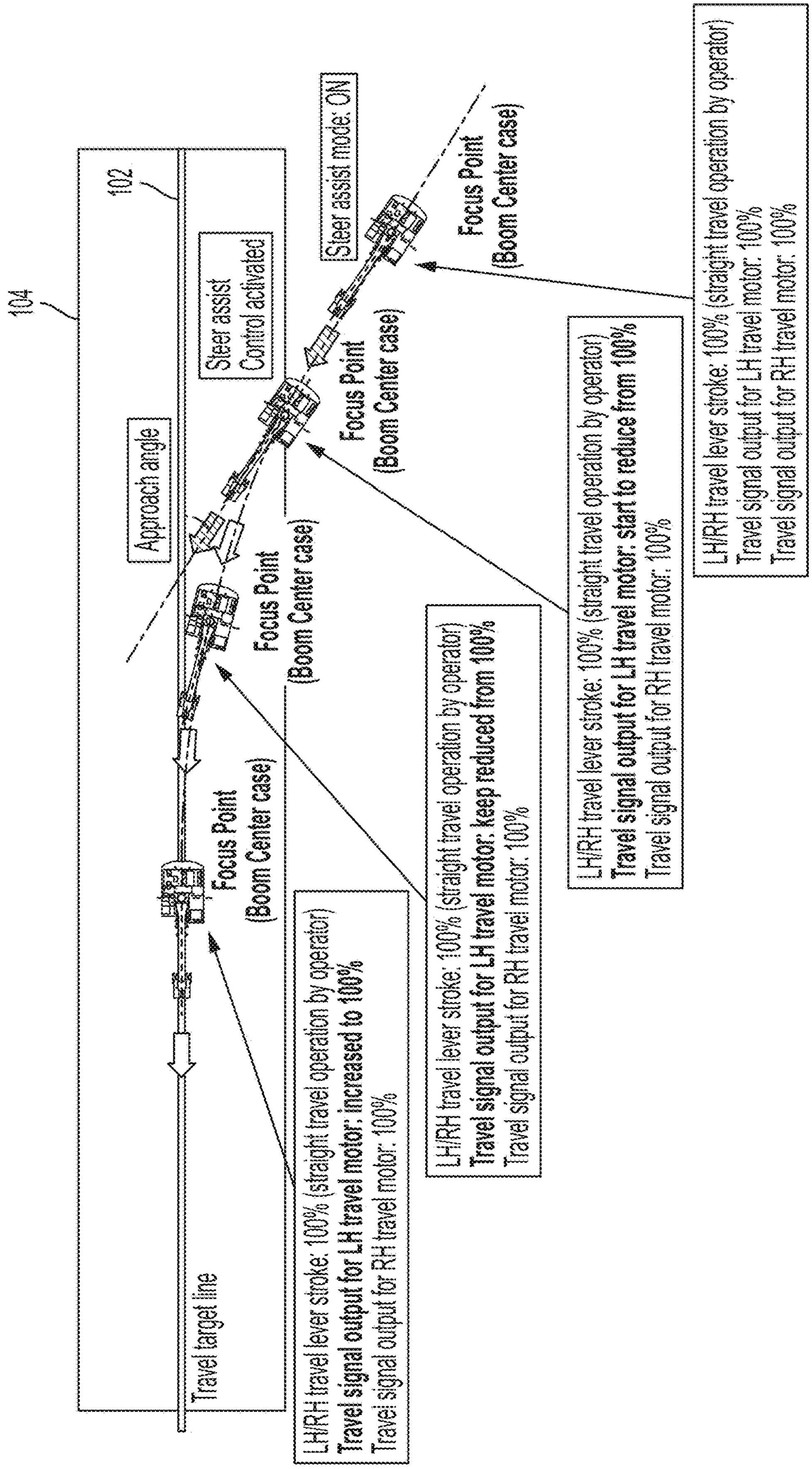
FIG. 7 and FIG. 8 are diagrams showing exemplary approach paths and corresponding capture ranges/areas for a mobile work machine according to one or more embodiments of the present disclosure.
Figure 8:
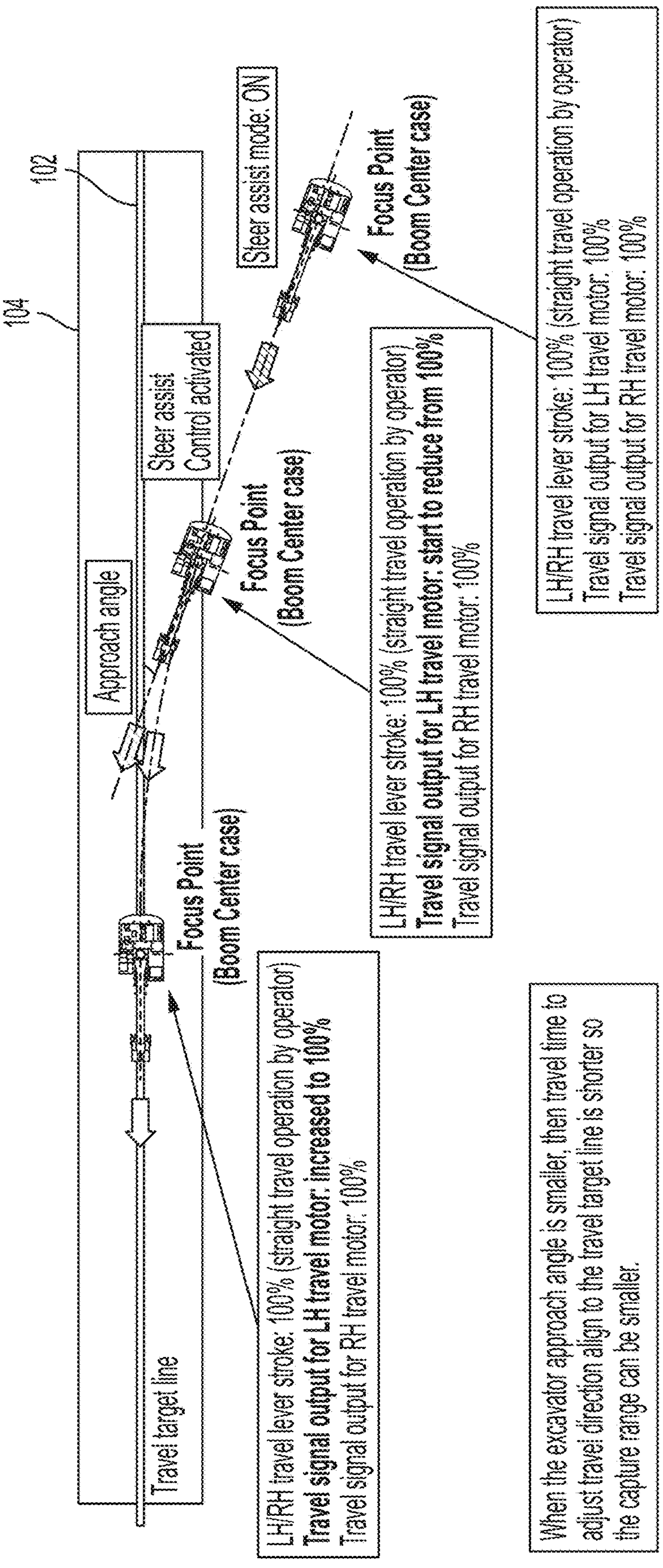

FIG. 7 and FIG. 8 are diagrams showing exemplary approach paths and corresponding capture ranges for the work machine 1 according to one or more embodiments of the present disclosure. Notably comparing FIG. 7 and FIG. 8, the approach angle in FIG. 7 is greater than the approach angle in FIG. 8. As such, the capture range or area 104 in FIG. 7 can be greater than the capture range or area 104 in FIG. 8 so in the former the steering assist mode can be activated earlier (assuming all other conditions are met) in order for the work machine 1, particularly the focus point 10 thereof, to become aligned with the target line 102. Also notable for both scenarios, the controller 38 can automatically control output of the left hydraulic motor 43 an the right hydraulic motor 44 to align the work machine 1 with the target line 102 even with the operation lever 23 and the operation lever 24 being at full stroke (or the operation lever 25 and the operation lever 26 being at full stroke). Here, it is noted that the travel path of the work machine 1 can be curved prior to reaching the target line 102 and then straight along the target line 102 (in a case where the target line 102 is straight).

Figure 9:
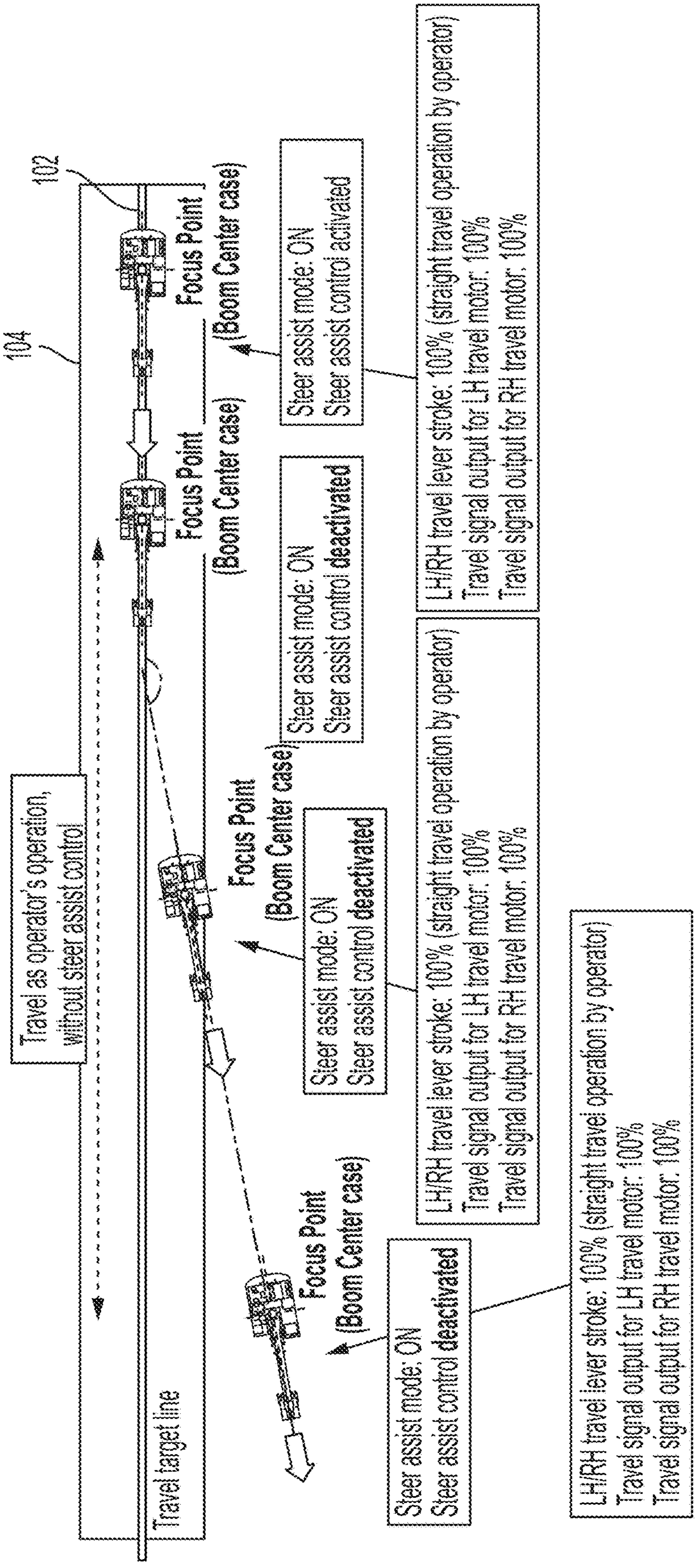
FIG. 9 is a diagram of an exemplary travel path for a mobile work machine according to one or more embodiments of the present disclosure.

FIG. 9 is a diagram of an exemplary travel path for the work machine 1 according to one or more embodiments of the present disclosure. Notably, FIG. 9 shows a scenario where the steering assist mode is deactivated responsive to the work machine 1 turning off of the target line 102. In this case, the angle θ of the work machine 1 would fall outside of the predetermined angle range ϕ. Hence, in that one of the criterion for activation of the steering assist mode is no longer met, the controller 38 can deactivate the steering assist mode, even though the steering assist mode is still enabled and the work machine 1 is within the capture range 104.

Figure 10:
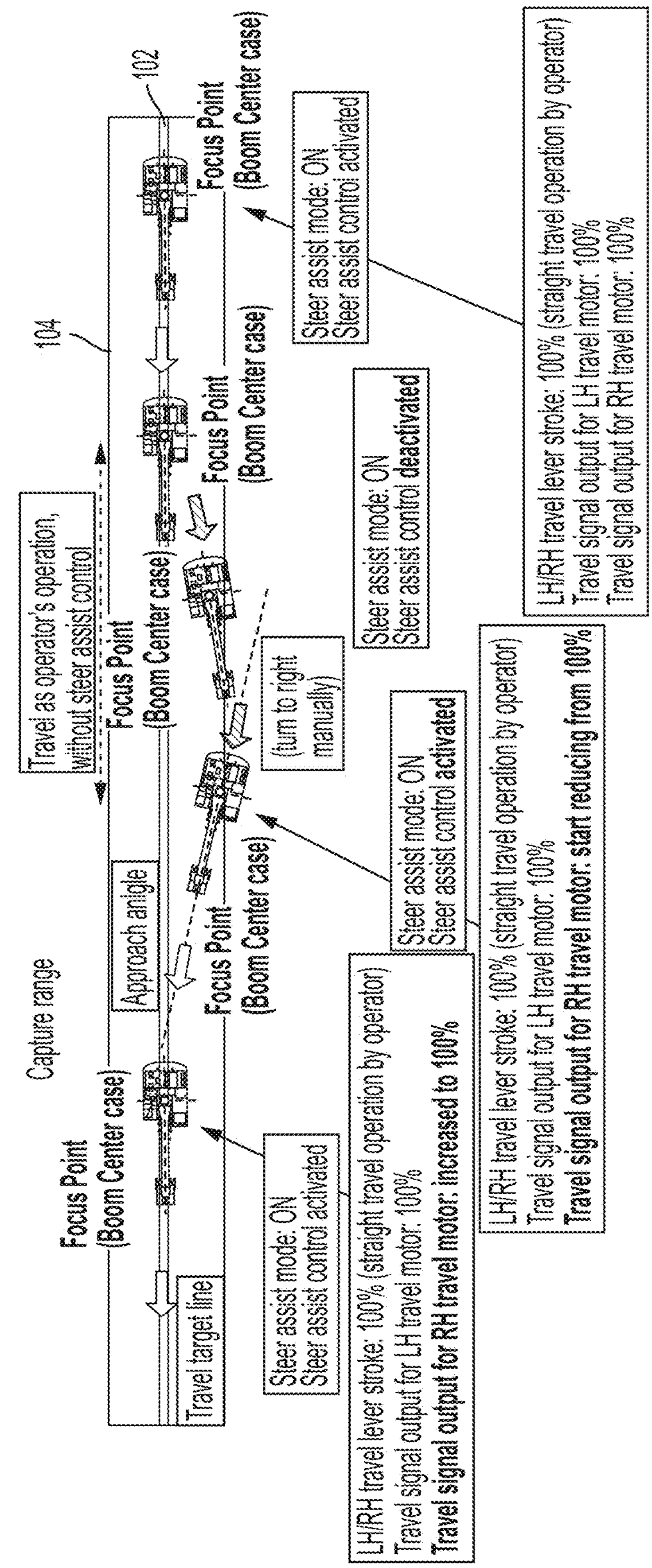
FIG. 10 is a diagram of an exemplary travel path for a mobile work machine according to one or more embodiments of the present disclosure.

FIG. 10 is a diagram of an exemplary travel path for the work machine 1 according to one or more embodiments of the present disclosure. Notably, FIG. 10 shows a scenario initially similar to FIG. 9 where the steering assist mode is deactivated responsive to the work machine 1 turning off of the target line 102. The operator then manually controls the work machine 1 to turn back toward the target line 102. With the work machine 1 still in the capture range 104, or upon the work machine 1 reentering the capture range 104, and with the steering assist mode enabled and the angle of the work machine 1 reaching the predetermined angle range, the controller 38 can activate (i.e., reactivate) the steering assist mode so the controller 38 can control travel of the work machine 1 to align (i.e., realign) with the target line 102.

FIG. 11 shows an operator interface 28 for the work machine 1 according to one or more embodiments of the present disclosure. The operator interface 28, which may be implemented in whole or in part as a graphical user interface (GUI) on the monitor 22, can show, among other features, a three-dimensional moving image (in real time) of the work machine 1 relative to the design line 100 and the target line 102. The capture range or area 104 may not be shown on the operator interface 28, according to one or more embodiments of the present disclosure.

Figure 12:
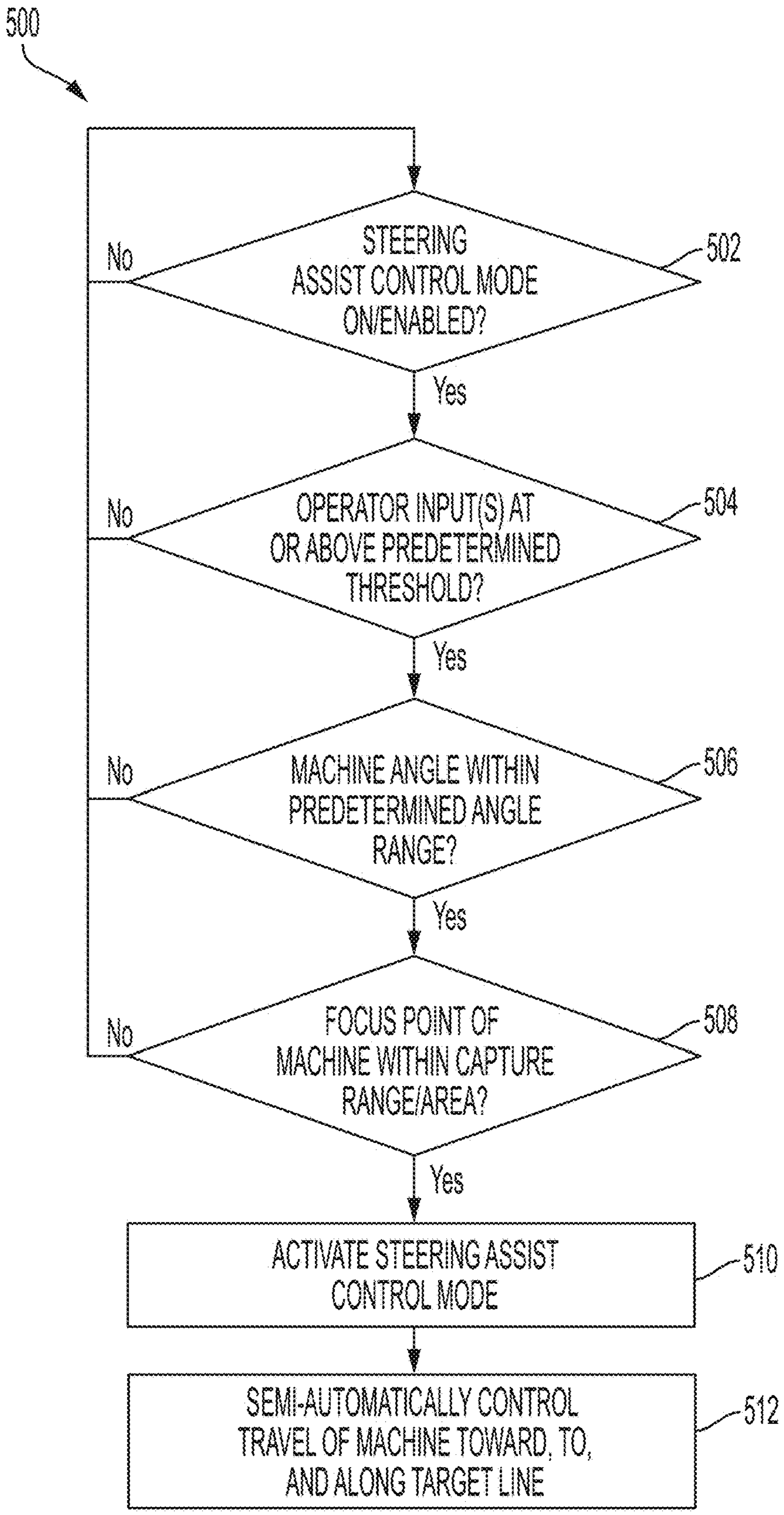
FIG. 12 is a flow chart for a method regarding a steering assist mode for controlling travel of a mobile work machine according to one or more embodiments of the present disclosure.

FIG. 12 is a flow chart of a method 500 regarding a steering assist mode for controlling travel of a mobile work machine, such as work machine 1, according to one or more embodiments of the present disclosure. Some or all of the method 500 can be performed via a non-transitory computer-readable storage medium (or media) (e.g., memory 39) having stored thereon instructions that, when executed by one or more processors, such as processor(s) of the controller 38, cause the one or more processors to perform some or all of the method 500. According to one or more embodiments, the method 500 may be referred to or characterized as a method for semi-automatic or semi-autonomous travel control of a mobile work machine (e.g., an earth-moving machine such as an excavator).

The method 500 can include, at 502, determining whether a steering assist mode is enabled or turned on. The steering assist mode can be enabled or turned on via the steering assist switch 27 on the monitor 22, as an example, though embodiments of the disclosed subject matter are not so limited. The controller 38 can determine whether the steering assist mode is enabled/turned on.

The method 500 can include, at 504, determining whether one or more operator inputs, such as the operation lever 23 and/or the operation lever 24 (or operation lever 25 and/or operation lever 26), are at or above a predetermined threshold. The controller 38 can make such determination. As mentioned above, the predetermined threshold can be stroke of the operation lever 23 and/or the operation lever 24 (or operation lever 25 and/or operation lever 26).

At 506, the method 500 can include determining whether an angle θ of the work machine 1, which may be regarded as an approach angle depending upon the position of the work machine 1 relative to a target line 102, is within a predetermined angle range ϕ relative to the target line 120. Determining whether the angle θ of the work machine 1 is within the predetermined angle range ϕ can be performed using GNSS data.

And at 508, the method 500 can include determining whether a focus point 10 of the work machine 1 is within a capture range or area 104 to activate the steering assist mode. Determining whether the focus point 10 of the work machine 1 is within the capture range 104 can be performed using GNSS data.

If the method 500 meets all of the conditions 502, 504, 506, and 508, the steering assist mode can be activated at 510. Upon activation of the steering assist mode, at 512 the work machine 1 can be automatically controlled, for instance, using the controller 38, such that the travel path thereof becomes aligned with the target line 102. The controller 38 can control actual output of the hydraulic motor 43 and/or the hydraulic motor 44 regardless of the operator's inputs to the operation lever 23 and the operation lever 24 (or operation lever 25 and operation lever 26) to control the travel of the work machine 1 so the work machine 1 is aligned with the target line 102. Here, the controller 38 can continuously check to make sure all of the requirements to activate the steering assist mode remain satisfied. If any one of the requirements are no longer met, the controller 38 can deactivate the steering assist mode.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, as used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present. This definition of "circuitry" can apply to all uses of this term in this application, including in any claims. As a further example, as used in this application, the term "circuitry" can also cover an implementation of merely a processor (or multiple processors) or portion of a processor and its (or their) accompanying software and/or firmware.

Use of the terms "data," "content," "information" and similar terms may be used interchangeably, according to some example embodiments of the present disclosure, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Aspects of the present disclosure have been described above with reference to flowchart illustrations and/or block diagrams of methods, apparatus (systems) and computer program products according to embodiments of the present disclosure. In this regard, the flowchart and block diagrams in the Figures illustrate the architecture, functionality, and operation of possible implementations of systems, methods and computer program products according to various embodiments of the present disclosure. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosed subject matter can also be as set forth according to the following parentheticals.

(1) An excavator comprising: a lower traveling body including a left track and a right track opposite the left track; an upper swing body including a cab and rotatably supported by the lower traveling body, the cab having a monitor, a left-hand lever to control the left track via a first hydraulic motor, and a right-hand lever to control the right track via a second hydraulic motor; and a controller operatively coupled to access computer-readable memory and configured to implement a semi-automatic steering assist mode of operation for the excavator, the controller being configured to determine whether a semi-automatic steering assist mode input in the cab is in an on state, determine whether an approach angle of the excavator, under full control of an operator in the cab, is within a predetermined angle range relative to a target line, determine whether a focus point of the excavator is within a capture range to activate the semi-automatic steering assist mode, activate the semi-automatic steering assist mode under a condition that the semi-automatic steering assist mode input in the cab is in the on state, the approach angle of the excavator relative to the target line is within the predetermined angle range, and the focus point of the excavator is at or within a capture area, and with the excavator in the semi-automatic steering assist mode, output control signaling to semi-automatically control travel of the lower traveling body of the excavator toward, to, and along the target line responsive to receipt of a first operator input in the cab and/or a second operator input in the cab continuously at or above a predetermined threshold.

(2) The excavator according to (1), wherein the controller outputs the control signaling to semi-automatically control travel of the lower traveling body responsive to receipt of the first operator input in the cab and second operator input in the cab continuously at or above the predetermined threshold.

(3) The excavator according to (1) or (2), wherein the controller is configured to deactivate the semi-automatic steering assist mode responsive to determining that the first operator input in the cab and/or second operator input in the cab is below the predetermined threshold.

(4) The excavator according to any one of (1) to (3), wherein the predetermined angle range for the approach angle is from greater than zero degrees to sixty degrees.

(5) The excavator according to any one of (1) to (4), wherein the capture area varies based on the approach angle of the excavator.

(6) The excavator according to any one of (1) to (5), wherein the controller determines whether the approach angle of the excavator, under the full control of the operator in the cab, is within the predetermined angle range relative to the target line based on global navigation satellite system (GNSS) data received by a GNSS receiver of the excavator.

(7) The excavator according to any one of (1) to (6), wherein the computer-readable memory stores work area three-dimensional design data including a design line or contour regarding a worksite associated with the excavator, and wherein the target line is settable based on an offset from the design line.

(8) The excavator according to any one of (1) to (7), wherein the target line and/or an approach path to the target line are curved.

(9) A method regarding semi-autonomous control of an earth moving work machine at a worksite, the method comprising: determining, using circuitry, whether a steering assist mode is in an enabled state; determining, using the circuitry, whether an approach angle of the earth moving work machine is within a predetermined angle range relative to a target line; determining, using the circuitry, whether a focus point of the earth moving work machine is within a capture range to activate the steering assist mode; activating, using the circuitry, the steering assist mode under a condition that the steering assist mode is enabled, the approach angle of the earth moving work machine relative to the target line is within the predetermined angle range, and the focus point of the earth moving work machine is at or within a capture area; and with the steering assist mode activated, outputting, using the circuitry, control signaling to semi-autonomously control travel of the earth moving work machine along the target line responsive to receipt of a first operator input in a cab of the earth moving work machine and/or a second operator input in the cab of the earth moving work machine at or above a predetermined threshold.

(10) The method according to (9), wherein said outputting, using the circuitry, the control signaling semi-autonomously controls travel of the earth moving work machine to the target line responsive to receipt of the first operator input in the cab of the earth moving work machine and/or the second operator input in the cab of the earth moving work machine at or above the predetermined threshold.

(11) The method according to (9) or (10), further comprising deactivating, using the circuitry, the steering assist mode responsive to determining that the first operator input in the cab and/or second operator input in the cab is below the predetermined threshold.

(12) The method according to any one of (9) to (11), wherein the predetermined angle range for the approach angle is from greater than zero degrees to sixty degrees, and wherein the capture area varies based on the approach angle of the earth moving work machine.

(13) The method according to any one of (9) to (12), wherein said determining whether the approach angle of the earth moving work machine is within the predetermined angle range relative to the target line is performed based on global navigation satellite system (GNSS) data received by a GNSS receiver of the earth moving work machine.

(14) The method according to any one of (9) to (13), further comprising setting, using an operator interface in the cab of the earth moving work machine, the target line based on an offset from a design line or contour associated with work area three-dimensional design data including the design line or contour regarding the worksite.

(15) A non-transitory computer-readable storage medium having stored thereon instructions that, when executed by one or more processors of a hydraulic excavator, causes the one or more processors to perform a method comprising: activating a steering assist mode to control travel of the hydraulic excavator responsive to the steering assist mode being in an enabled state, an approach angle of the hydraulic excavator being within a predetermined angle range relative to a target line for the hydraulic excavator to perform work at design line or contour at a worksite, and a focus point of the hydraulic excavator being within a capture range to activate the steering assist mode; and with the steering mode in an activated state based on said activating, controlling travel of the hydraulic excavator relative to the target line responsive to receipt of a first operator input in a cab of the hydraulic excavator and a second operator input in the cab of the hydraulic excavator at a same time and continuously at or above a predetermined threshold.

(16) The non-transitory computer-readable storage medium according to (15), wherein the method further comprises, with the steering mode in the activated state, deactivating the steering assist mode responsive to responsive to the first operator input and/or the second operator input being below the predetermined threshold for a predefined amount of time.

(17) The non-transitory computer-readable storage medium according to (15) or (16), wherein the method further comprises, prior to said activating the steering assist mode, declining to activate the steering assist mode responsive to any of the following: the steering assist mode being in a non-enabled state, the approach angle of the hydraulic excavator is outside of the predetermined angle range relative to the target line, and the focus point of the hydraulic excavator is outside of the capture range to activate the steering assist mode.

(18) The non-transitory computer-readable storage medium according to any one of (15) to (17), wherein for said controlling the travel of the hydraulic excavator relative to the target line operator input to the first operator input and/or operator input to the second operator input do not match output of a first hydraulic motor and/or output of a second hydraulic motor, respectively.

(19) The non-transitory computer-readable storage medium according to any one of (15) to (18), wherein said activating the steering assist mode to control the travel of the hydraulic excavator transitions the hydraulic excavator from full control by the operator to semi-automatic control by the operator.

(20) The non-transitory computer-readable storage medium according to any one of (15) to (19), wherein said controlling the travel of the hydraulic excavator relative to the target line with the steering assist mode in the activated state includes semi-automatically controlling the hydraulic excavator toward, to, and/or along the target line.

It must be noted that, as used in the specification and the appended claims, the singular forms “a,” “an,” and “the” include plural referents unless the context clearly dictates otherwise. That is, unless clearly specified otherwise, as used herein the words “a” and “an” and the like carry the meaning of “one or more.” The use of the term “at least one” followed by a list of one or more items (for example, “at least one of A and B” or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word “or” refers to any possible permutation of a set of items. For example, the phrase “A, B, or C” refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as “left,” “right,” “top,” “bottom,” “front,” “rear,” “side,” “height,” “length,” “width,” “upper,” “lower,” “interior,” “exterior,” “inner,” “outer,” and the like that may be used herein, merely describe points of reference and do not necessarily limit embodiments of the disclosed subject matter to any particular orientation or configuration. Furthermore, terms such as “first,” “second,” “third,” etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. An excavator comprising:

a lower traveling body including a left track and a right track opposite the left track;

an upper swing body including a cab and rotatably supported by the lower traveling body, the cab having a monitor, a left-hand lever to control the left track via a first hydraulic motor, and a right-hand lever to control the right track via a second hydraulic motor; and a controller operatively coupled to access computer-readable memory and configured to implement a semi-automatic steering assist mode of operation for the excavator, the controller being configured, while the excavator is traveling via the lower traveling body, to determine whether a semi-automatic steering assist mode input in the cab is in an on state, under full control of an operator in the cab, determine whether an approach angle of the excavator relative to a target travel line along which a focus point of the excavator is to travel while performing a digging operation is within a predetermined angle range relative to said target travel line for the focus point of the excavator to travel along for performing the digging operation, wherein the target travel line for the focus point of the excavator to travel along for performing the digging operation is set in advance so as to be offset in correspondence with and relative to a target design shape for the digging operation, determine whether the focus point of the excavator is at or within a capture area for activating the semi-automatic steering assist mode, wherein the capture area for activating the semi-automatic steering assist mode is a set distance away from the target travel line, activate the semi-automatic steering assist mode in response to the semi-automatic steering assist mode input in the cab being in the on state, the approach angle of the excavator relative to the target travel line being within the predetermined angle range, and the focus point of the excavator being at or within the capture area, and with the excavator staying in the semi-automatic steering assist mode, output control signaling to semi-automatically control travel of the lower traveling body of the excavator toward, to, and along the target travel line responsive to receipt of a first operator input in the cab and/or a second operator input in the cab continuously at or above a predetermined threshold.

2. The excavator according to claim 1, wherein the controller outputs the control signaling to semi-automatically control travel of the lower traveling body responsive to receipt of the first operator input in the cab and the second operator input in the cab continuously at or above the predetermined threshold.

3. The excavator according to claim 1, wherein the controller is configured to deactivate the semi-automatic steering assist mode responsive to determining that the first operator input in the cab and/or the second operator input in the cab is below the predetermined threshold.

4. The excavator according to claim 1, wherein the predetermined angle range for the approach angle is from greater than zero degrees to sixty degrees.

5. The excavator according to claim 1, wherein a width of the capture area varies based on the approach angle of the excavator.

6. The excavator according to claim 1, wherein the controller determines whether the approach angle of the excavator, under the full control of the operator in the cab, is within the predetermined angle range relative to the target travel line based on global navigation satellite system (GNSS) data received by a GNSS receiver of the excavator.

7. The excavator according to claim 1, wherein the computer-readable memory stores work area three-dimensional design data including the target design shape regarding a worksite associated with the excavator for performing the digging operation according to the target design shape and along the target travel line.

8. The excavator according to claim 1, wherein the target travel line and/or an approach path to the target travel line are curved.

9. A method regarding semi-autonomous control of an earth moving work machine at a worksite, the method comprising:

- determining, using circuitry, whether a steering assist mode is in an enabled state;
- determining, using the circuitry, whether an approach angle of the earth moving work machine relative to a target travel line along which a focus point of the earth moving work machine is to travel is within a predetermined angle range relative to said target travel line along which the focus point of the excavator is to travel,
  - wherein the target travel line along which the the focus point of the earth moving work machine is to travel is set in correspondence with and relative to a target design shape for a work area;
- determining, using the circuitry, whether the focus point of the earth moving work machine has entered a capture area for activating the steering assist mode,
  - wherein the capture area to activate the steering assist mode is a set distance away from the target travel line;
- activating, using the circuitry, the steering assist mode under a condition that the steering assist mode is enabled, the approach angle of the earth moving work machine relative to the target travel line is within the predetermined angle range, and the focus point of the earth moving work machine is determined to have entered the capture area for activating the steering assist mode; and
- with the steering assist mode activated, outputting, using the circuitry, control signaling to semi-autonomously control travel of the earth moving work machine along the target travel line responsive to receipt of a first operator input in a cab of the earth moving work machine and/or a second operator input in the cab of the earth moving work machine at or above a predetermined threshold.

10. The method according to claim 9, wherein said outputting, using the circuitry, the control signaling semi-autonomously controls travel of the earth moving work machine to the target travel line responsive to receipt of the first operator input in the cab of the earth moving work machine and the second operator input in the cab of the earth moving work machine at or above the predetermined threshold.

11. The method according to claim 9, further comprising deactivating, using the circuitry, the steering assist mode responsive to determining that the first operator input in the cab and/or the second operator input in the cab is below the predetermined threshold.

12. The method according to claim 9,

- wherein the predetermined angle range for the approach angle is from greater than zero degrees to sixty degrees, and
- wherein the set distance for the capture area varies based on the approach angle of the earth moving work machine.

13. The method according to claim 9, wherein said determining whether the approach angle of the earth moving work machine is within the predetermined angle range relative to the target travel line is performed based on global navigation satellite system (GNSS) data received by a GNSS receiver of the earth moving work machine.

14. The method according to claim 9, further comprising setting; the target travel line according to an offset from the target design shape associated with the work area.

15. A non-transitory computer-readable storage medium having stored thereon instructions that, when executed by one or more processors of an excavator, causes the one or more processors to perform a method comprising:

- activating a steering assist mode to control travel of the excavator responsive to the steering assist mode being in an enabled state, an approach angle of the excavator being within a predetermined angle range relative to a target travel line along which a focus point of the excavator is to travel to perform work at a design line or contour at a worksite, and the focus point of the excavator being within a capture area for activating the steering assist mode; and
- with the steering assist mode in an activated state based on said activating, controlling travel of the excavator relative to the target travel line responsive to receipt of a first operator input in a cab of the excavator and/or a second operator input in the cab of the excavator continuously at or above a predetermined threshold,
- wherein the target travel line for the focus point of the excavator to travel along is set in correspondence with and relative to the design line or contour at the worksite,
- wherein the capture area for activating the steering assist mode is a set distance away from the target travel line, and
- wherein prior to said activating the steering assist mode the focus point of the excavator is outside the capture area for activating the steering assist mode.

16. The non-transitory computer-readable storage medium according to claim 15, wherein the method further comprises, with the steering assist mode in the activated state, deactivating the steering assist mode responsive to the first operator input and/or the second operator input being below the predetermined threshold for a predefined amount of time.

17. The non-transitory computer-readable storage medium according to claim 15, wherein the method further comprises, prior to said activating the steering assist mode, declining to activate the steering assist mode responsive to any of the following: the steering assist mode being in a non-enabled state, the approach angle of the excavator is outside of the predetermined angle range relative to the target travel line, and the focus point of the excavator is outside of the capture area for activating the steering assist mode.

18. The non-transitory computer-readable storage medium according to claim 15, wherein for said controlling the travel of the excavator relative to the target travel line, operator input to the first operator input and/or operator input to the second operator input do not match output of a first motor and/or output of a second motor, respectively.

19. The non-transitory computer-readable storage medium according to claim 15, wherein said activating the steering assist mode to control the travel of the excavator transitions the excavator from full control by the operator to semi-automatic control by the operator.

20. The non-transitory computer-readable storage medium according to claim 15, wherein said controlling the travel of the excavator relative to the target travel line with the steering assist mode in the activated state includes semi-automatically controlling the excavator toward, to, and/or along the target travel line.

* * * * *